(12) United States Patent
Lee et al.

(10) Patent No.: US 11,044,757 B2
(45) Date of Patent: Jun. 22, 2021

(54) CARRIER-DEPENDENT RANDOM ACCESS CHANNEL (RACH) RESPONSE SEARCH SPACE

(71) Applicant: QUALCOMM Incorporated, San Diego, CA (US)

(72) Inventors: Heechoon Lee, San Diego, CA (US); Peter Gaal, San Diego, CA (US); Jing Sun, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/151,405

(22) Filed: Oct. 4, 2018

(65) Prior Publication Data

US 2019/0110320 A1 Apr. 11, 2019

Related U.S. Application Data

(60) Provisional application No. 62/570,050, filed on Oct. 9, 2017.

(51) Int. Cl.
| | |
|---|---|
| *H04W 74/08* | (2009.01) |
| *H04W 76/11* | (2018.01) |
| *H04W 74/00* | (2009.01) |
| *H04W 72/04* | (2009.01) |
| *H04L 5/00* | (2006.01) |
| *H04B 7/0413* | (2017.01) |

(52) U.S. Cl.
CPC ......... *H04W 74/0833* (2013.01); *H04L 5/001* (2013.01); *H04L 5/0053* (2013.01); *H04W 72/0453* (2013.01); *H04W 74/002* (2013.01); *H04W 76/11* (2018.02); *H04B 7/0413* (2013.01)

(58) Field of Classification Search
None
See application file for complete search history.

(56) References Cited

U.S. PATENT DOCUMENTS

| | | | |
|---|---|---|---|
| 5,373,242 A | 12/1994 | Joulie et al. | |
| 2010/0296467 A1* | 11/2010 | Pelletier | H04W 74/002 370/329 |
| 2012/0199379 A1 | 8/2012 | Hyde et al. | |
| 2012/0250520 A1* | 10/2012 | Chen | H04L 5/001 370/241 |
| 2013/0010711 A1* | 1/2013 | Larsson | H04W 56/0005 370/329 |

(Continued)

FOREIGN PATENT DOCUMENTS

CN 2414537 Y 1/2001

OTHER PUBLICATIONS

Discussion on RACH configuration and Msg.2 transmission By CMCC 3GPP TSG RAN WG1 Meeting #90 Aug. 2, 2017 (Year: 2017).*

(Continued)

*Primary Examiner* — Ajit Patel
*Assistant Examiner* — Pamit Kaur
(74) *Attorney, Agent, or Firm* — Patterson + Sheridan, L.L.P.

(57) ABSTRACT

Certain aspects of the present disclosure relate to communication systems, and more particularly, to random access channel (RACH) procedures in deployments where a RACH transmission may be sent on different UL carriers, which may include supplemental UL (SUL) carriers.

10 Claims, 11 Drawing Sheets

(56) References Cited

U.S. PATENT DOCUMENTS

2018/0084550 A1* 3/2018 Chen ................ H04W 52/38
2018/0279380 A1* 9/2018 Jung ................ H04W 74/0833

OTHER PUBLICATIONS

General aspects for NR search space by Intel, 3GPP TSG RAN WG1 Meeting #88 Spokane, USA, 3rd -7th Apr. 2017 (Year: 2017).*

International Search Report and Written Opinion—PCT/US2018/054532 ISA/EPO—dated Oct. 17, 2018.

CMCC: "Discussion on RACH Configuration and Msg.2 transmission", 3GPP Draft; R1-1714173, 3rd Generation Partnership Project (3GPP), Mobile Competence Centre, 650, Route Des Lucioles; F-06921 Sophia-Anti polis Cedex, France, vol. RAN WG1, No. Prague, P.R. Czechia; Aug. 21, 2017-Aug. 25, 2017, Aug. 20, 2017 (Aug. 20, 2017), XP051316962, Retrieved from the Internet: URL:http://www.3gpp.org/ftp/Meetings_3GPP_SYNC/RAN1/Docs, 4 pages.

Intel Corporation: "General Aspects for NR Search Space", 3GPP Draft; R1-1704746 Intel Nrsearch Space, 3rd Generation Partnership Project (3GPP), Mobile Competence Centre, 650, Route Des Lucioles; F-06921 Sophia-Anti polis Cedex, France, vol. RAN WG1, No. Spokane, USA; Apr. 3, 2017-Apr. 7, 2017, Apr. 2, 2017 (Apr. 2, 2017), XP051242884, Retrieved from the Internet: URL:http://www.3gpp.org/ftp/Meetings_3GPP_SYNC/RAN1/Docs/, pp. 1-5.

Intel Corporation: "NR Random Access Procedure", 3GPP Draft; R1-1704715 RA Procedure, 3rd Generation Partnership Project (3GPP), Mobile Competence Centre, 650, Route Des Lucioles; F-06921 Sophia-Anti polis Cedex, France, vol. RAN WG1, No. Spokane, USA; Apr. 3, 2017-Apr. 7, 2017, Apr. 2, 2017 (Apr. 2, 2017), XP051242853, Retrieved from the Internet: URL:http://www.3gpp.org/ftp/Meetings_3GPP_SYNC/RAN1/Docs/, pp. 1-7.

Intel Corporation: "Resource allocation for NR uplink control channel", 3GPP Draft; R1-1704753 Intel Resource Allocation PUCCH, 3rd Generation Partnership Project (3GPP), Mobile Competence Centre, 650, Route Des Lucioles; F-06921 Sophia-Anti polis Cedex, France, vol. RAN WG1, No. Spokane, USA; Apr. 3, 2017-Apr. 7, 2017, Apr. 2, 2017 (Apr. 2, 2017), XP051242891, Retrieved from the Internet: URL:http:8//http://www.3gpp.org/ftp/Meetings_3GPP_SYNC/RAN1/Docs/, pp. 1-3.

International Search Report and Written Opinion—PCT/US2018/054532—ISA/EPO—dated Dec. 7, 2018.

NTT DOCOMO., et al., "Views on Other Aspect on Carrier Aggregation", 3GPP Draft; R1-1718224 Other CA Aspect, 3rd Generation Partnership Project (3GPP), Mobile Competence Centre, 650, Route Des Lucioles; F-06921 Sophia-Anti polis Cedex, France, vol. RAN WG1, No. Prague, CZ; Oct. 9, 2017-Oct. 13, 2017, Oct. 8, 2017 (Oct. 8, 2017), XP051341406, Retrieved from the Internet: URL:http://www.3gpp.org/ftp/Meetings_3GPP_SYNC/RAN1/Docs/, pp. 1-3.

* cited by examiner

CARRIER-DEPENDENT RANDOM ACCESS CHANNEL (RACH) RESPONSE SEARCH SPACE

CLAIM OF PRIORITY UNDER 35 U.S.C. § 119

This application claims the benefit of U.S. Provisional Patent Application Ser. No. 62/570,050, filed Oct. 9, 2017, which is herein incorporated by reference in its entirety.

FIELD

The present disclosure relates generally to wireless communication systems, and more particularly, to random access procedures.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes transmitting a random access channel (RACH) on an uplink carrier selected from at least two available uplink carriers, determining, based on the uplink carrier on which the RACH was transmitted, a search space to monitor for a random access channel response (RAR) transmitted on a downlink carrier, and monitoring for the RAR in the determined search space.

Certain aspects provide a method for wireless communication by a base station (BS). The method generally includes receiving a random access channel (RACH) on an uplink carrier from at least two available uplink carriers, determining, based on the uplink carrier on which the RACH was transmitted, a search space to use for transmitting a random access channel response (RAR) on a downlink carrier, and transmitting the RAR in the determined search space.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
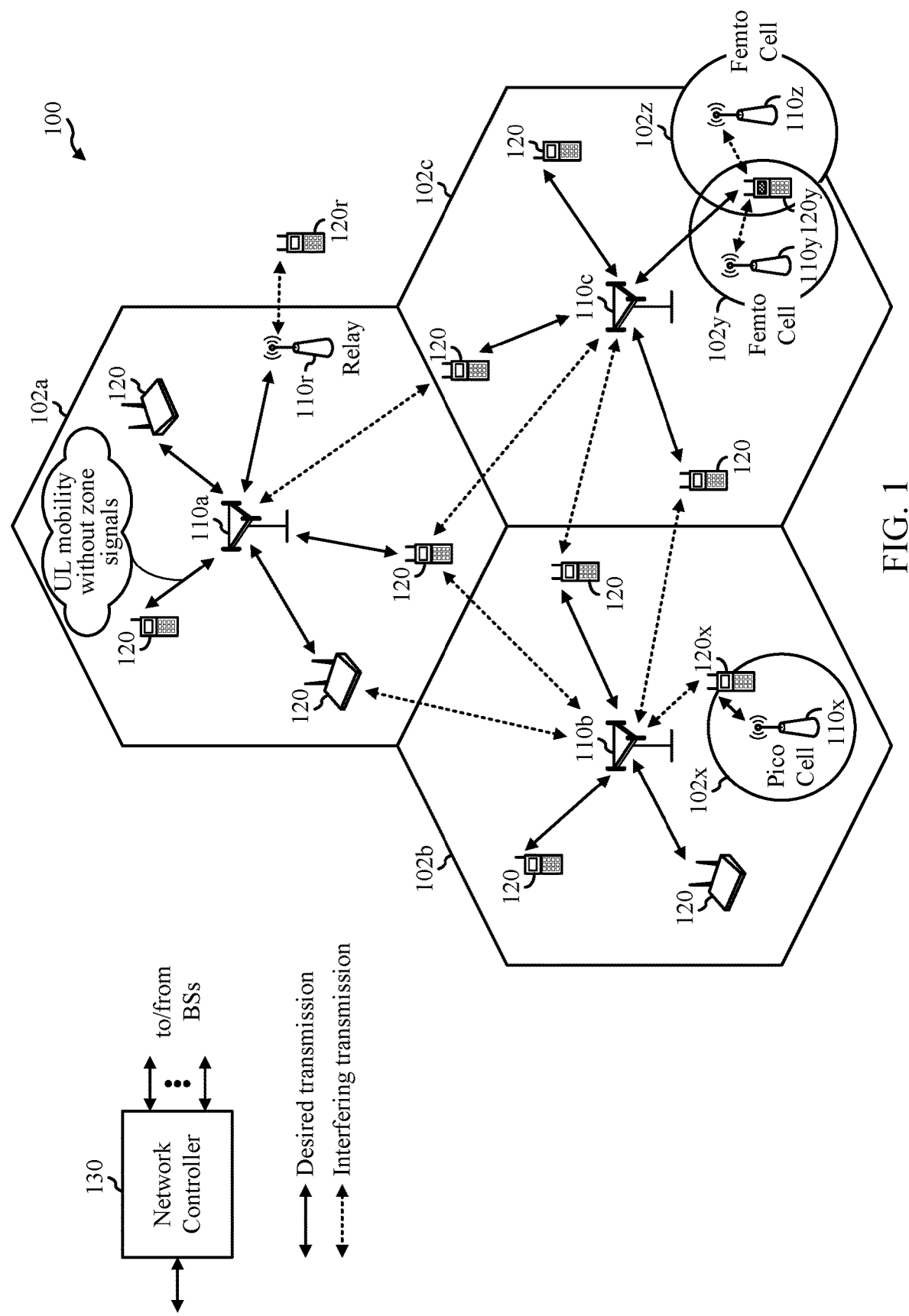
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Aspects provide techniques and apparatus for to resource element group (REG) bundle interleaver design for mapping of REGs to control channel elements (CCEs) to support control resource set (coreset) overlapping in communication systems operating according to NR technologies. Aspects provide a two step interleaver design for efficient overlapping coreset. The first step includes permuting REG bundles in a segment of REG bundles to produced interleaved blocks (e.g., groups) of REG bundles, such that REG bundles from a same CCE are in different interleaved blocks. Thus, in the second step of the interleaving, the interleaved blocks are interleaved across the entire coreset and the REG bundles of the same CCE in the different blocks can end up far apart, thereby improving frequency diversity.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and evolved NB (eNB), NB, 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, sub-bands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
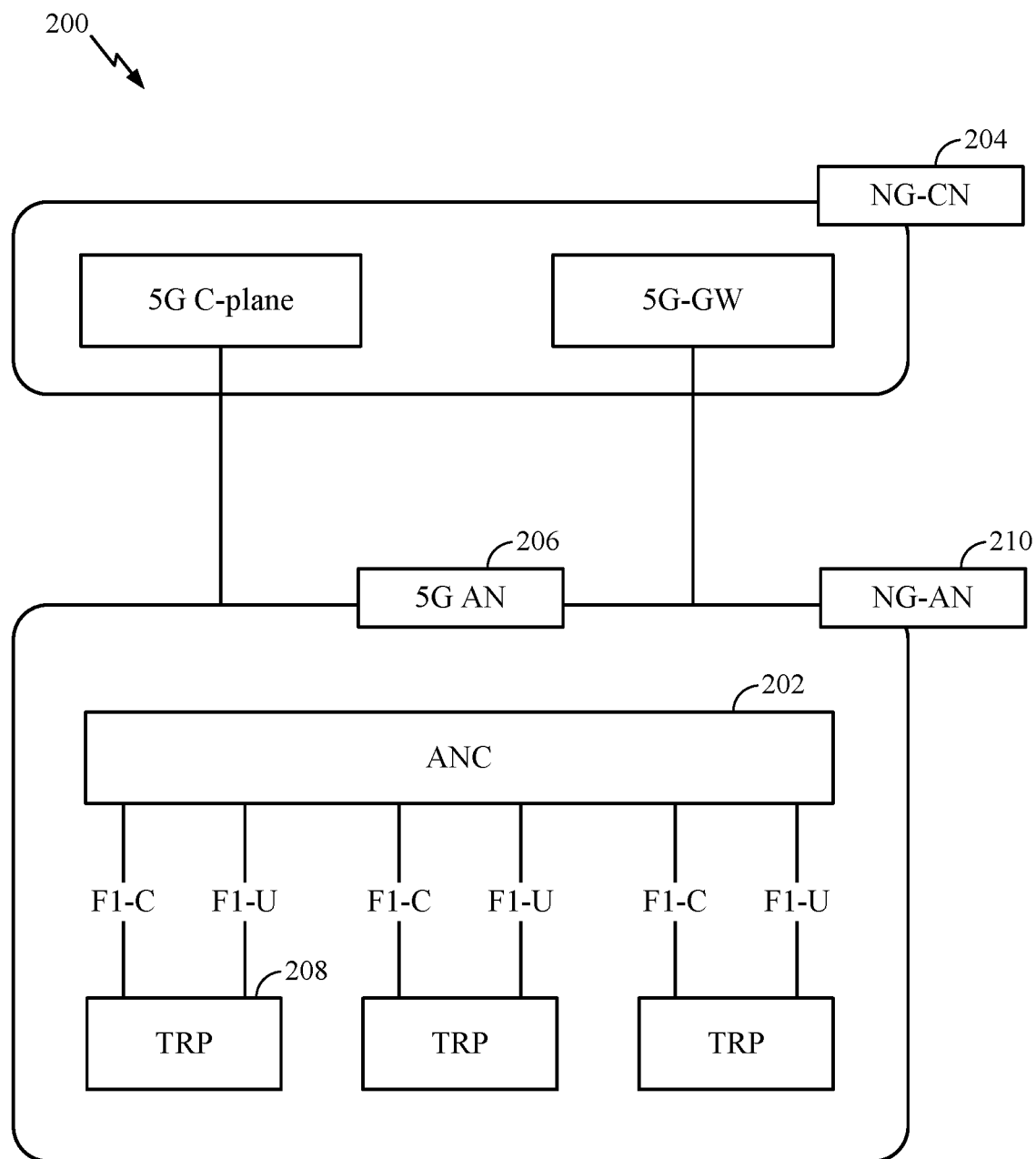
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208. As described above, a TRP may be used interchangeably with "cell".

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP 208 may include one or more antenna ports. The TRPs may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may not be present.

The logical architecture may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). A BS may include a central unit (CU) (e.g., ANC 202) and/or one or more distributed units (e.g., one or more TRPs 208).

Figure 3:
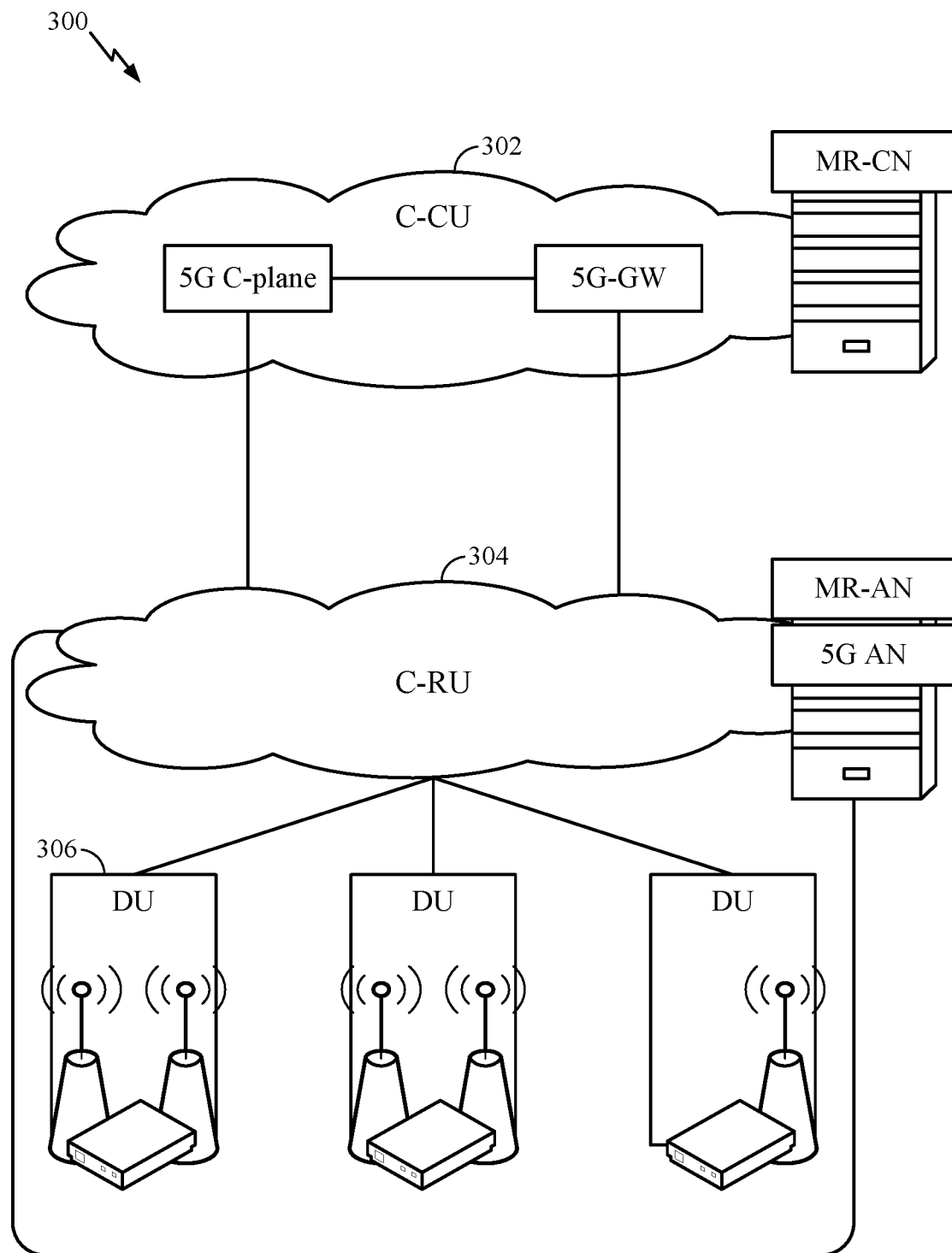
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity. A centralized RAN unit (C-RU) 304 may host one or more ANC functions. The C-RU 304 may host core network functions locally. The C-RU 304 may have distributed deployment. The C-RU 304 may be close to the network edge. A DU 306 may host one or more TRPs. The DU 306 may be located at edges of the network with radio frequency (RF) functionality.

Figure 4:
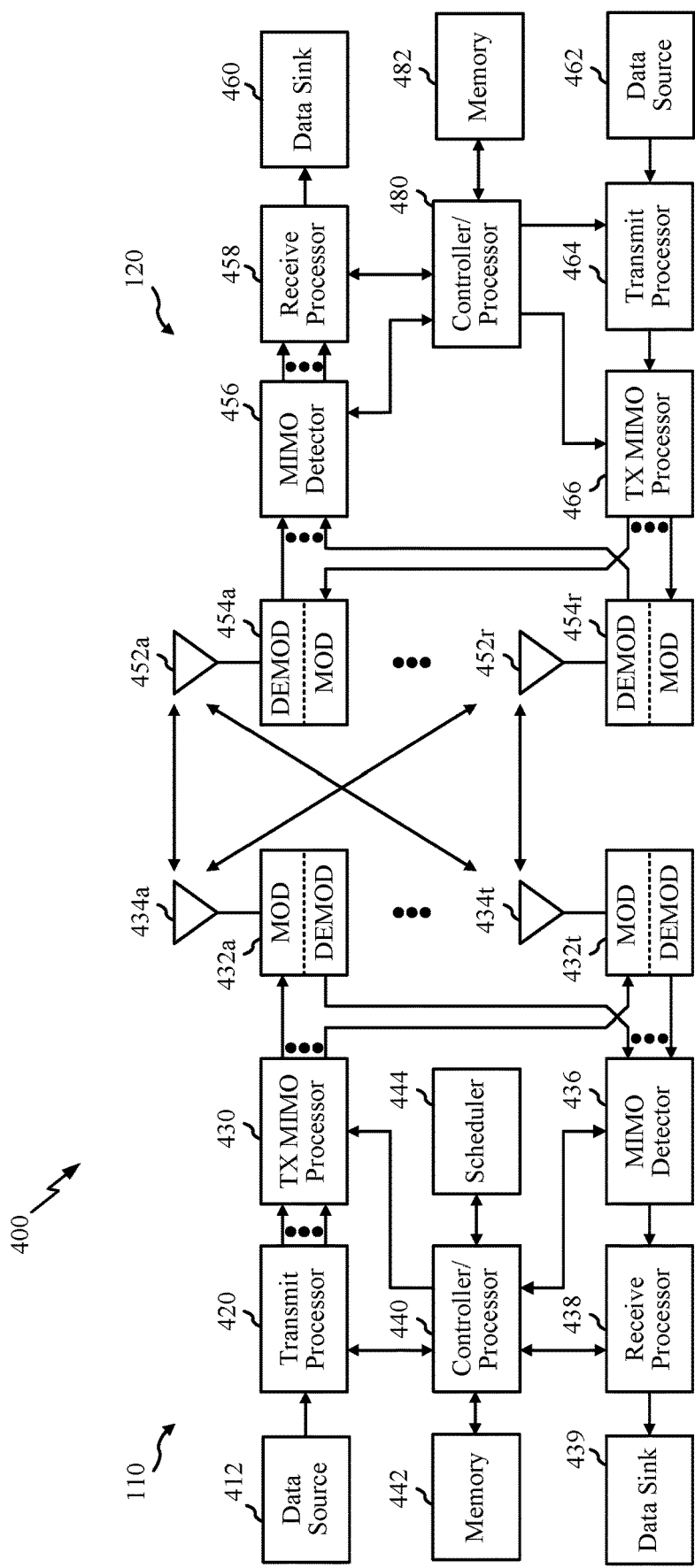
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a transmitter receiver point (TRP). One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 10, 11, 14, and 15.

FIG. 4 shows a block diagram of a design of a BS 110 and a UE 120, which may be one of the BSs and one of the UEs in FIG. 1. For a restricted association scenario, the BS 110 may be the macro BS 110*c* in FIG. 1, and the UE 120 may be the UE 120*y*. The BS 110 may also be a BS of some other type. The BS 110 may be equipped with antennas 434*a* through 434*t*, and the UE 120 may be equipped with antennas 452*a* through 452*r*.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 10, 11, 13, and 14 and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
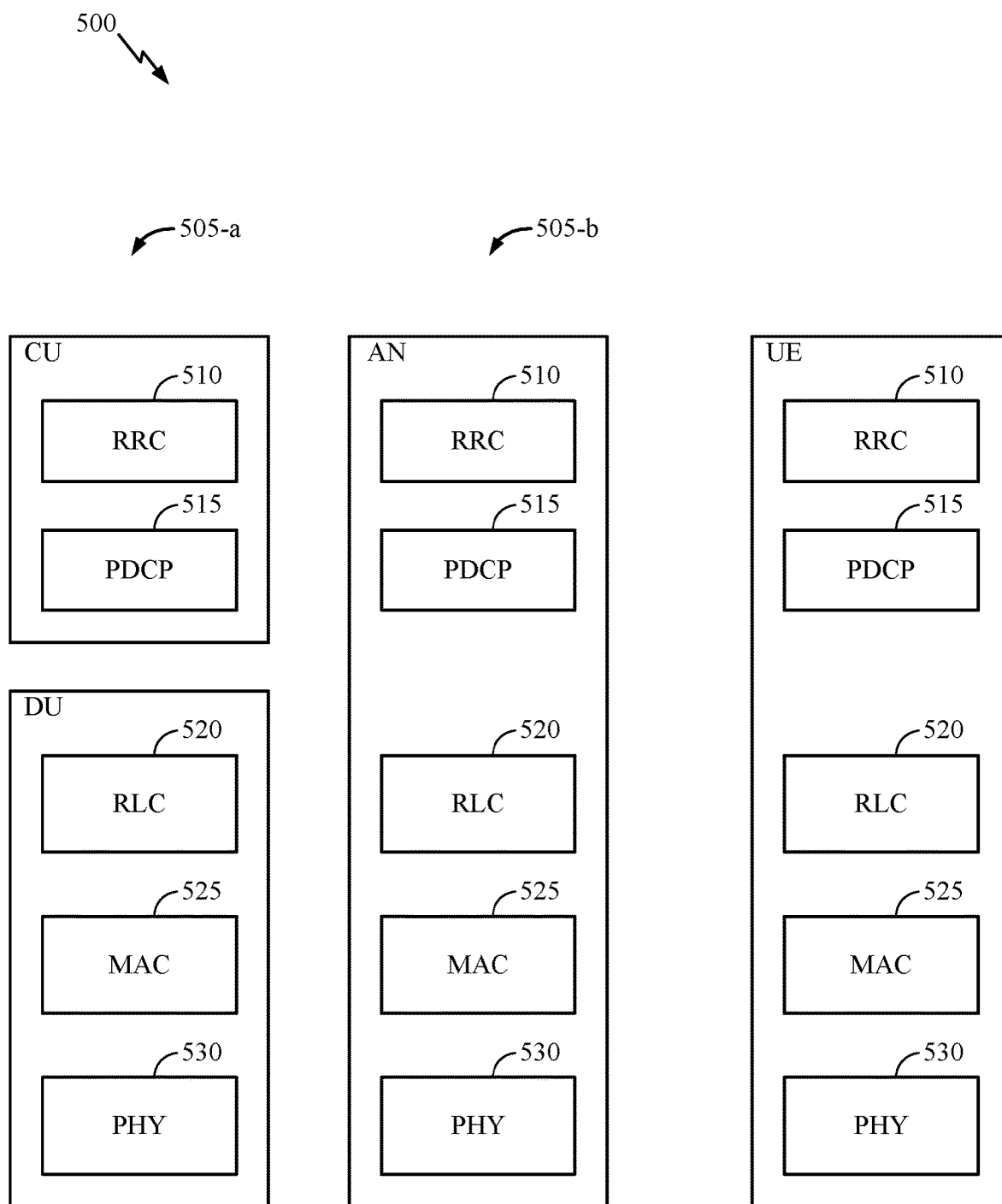
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
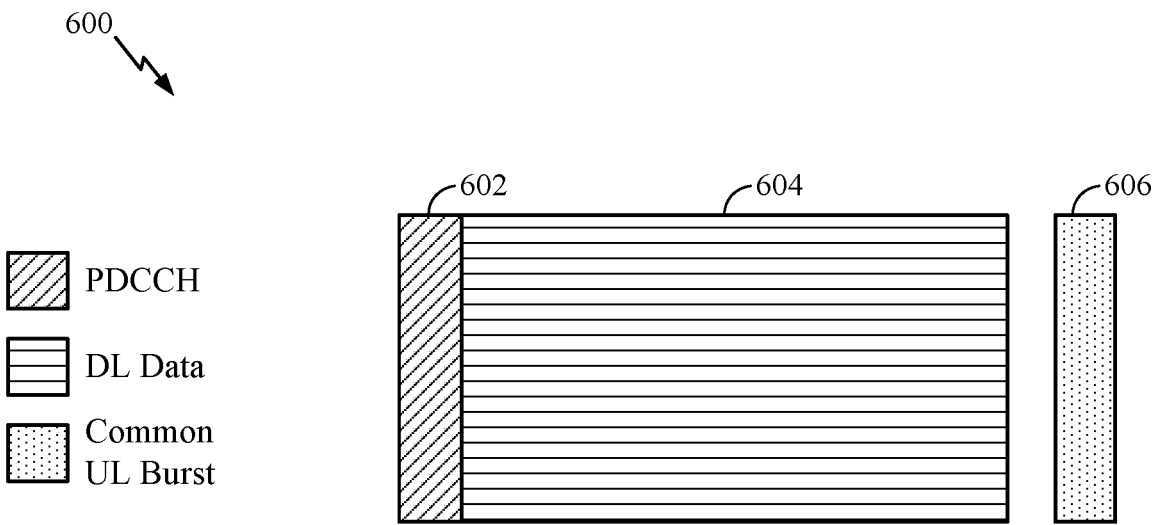
FIG. 6 illustrates an example of a downlink-centric subframe, in accordance with certain aspects of the present disclosure.

FIG. 6 is a diagram showing an example of a DL-centric subframe 600 (e.g., also referred to as a slot). The DL-centric subframe 600 may include a control portion 602. The control portion 602 may exist in the initial or beginning portion of the DL-centric subframe. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe 600. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
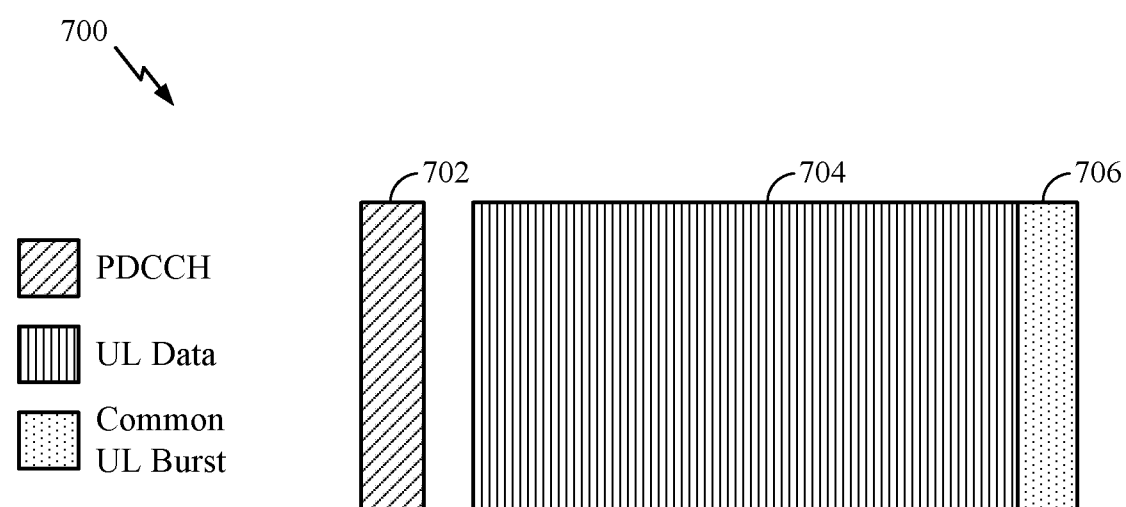
FIG. 7 illustrates an example of an uplink-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Control Resource Sets (Coresets)

In communications systems operating according to new radio (NR) (e.g., 5G) standards, one or more control resource sets (coresets) for transmission of control information, such as downlink control information (DCI), which may be carried on the physical downlink control channel (PDCCH), may be supported. A coreset may include one or more control resources (e.g., time and frequency resources) configured for conveying the control information. Within each coreset, one or more search spaces (e.g., common search space, UE-specific search space, etc.) may be defined for a given UE. As used herein, the term search space generally refers to the set of resources on which different decoding candidates for a channel of a defined format, such as a PDCCH, may be transmitted. Each decoding candidate refers to resources for one valid channel transmission. The number of valid decoding candidates depends on the size of the search space and the size (payload) of each channel.

A coreset may be defined in units of resource element groups (REGs). Each REG may include a fixed number (e.g., twelve, or some other number) of tones in one symbol period (e.g., a symbol period of a slot), where one tone in one symbol period is referred to as a resource element (RE). A fixed number of REGs may be included in a control channel element (CCE) (e.g., a CCE may include six REGs). Sets of CCEs may be used to transmit NR-PDCCH, with different numbers of CCEs in the sets used to transmit NR-PDCCH using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

In certain aspects, a next generation Node B (e.g., gNB) (e.g., in communication systems that support NR) may support coresets of different lengths that span multiple symbol periods (e.g., OFDM symbol periods). That is, the control channel candidates may be mapped to a single OFDM or multiple (e.g., two, three, etc.) OFDM symbols. Coresets can be associated with different aggregation levels.

Example Carrier-dependent RACH Response Search Space

Certain wireless communication system deployments utilize multiple downlink (DL) component carriers (CCs) as part of a carrier aggregation (CA) scheme. For example, in addition to a primary DL CC, one or more supplemental DL (SDL) CCs may be used to enhance date throughput and/or reliability. Supplemental DL may generally refer to a DL CC without a corresponding UL CC in the cell. In other words, SDL may generally refer to the case when there is only DL resource for a carrier from the perspective of a device.

Figure 8:
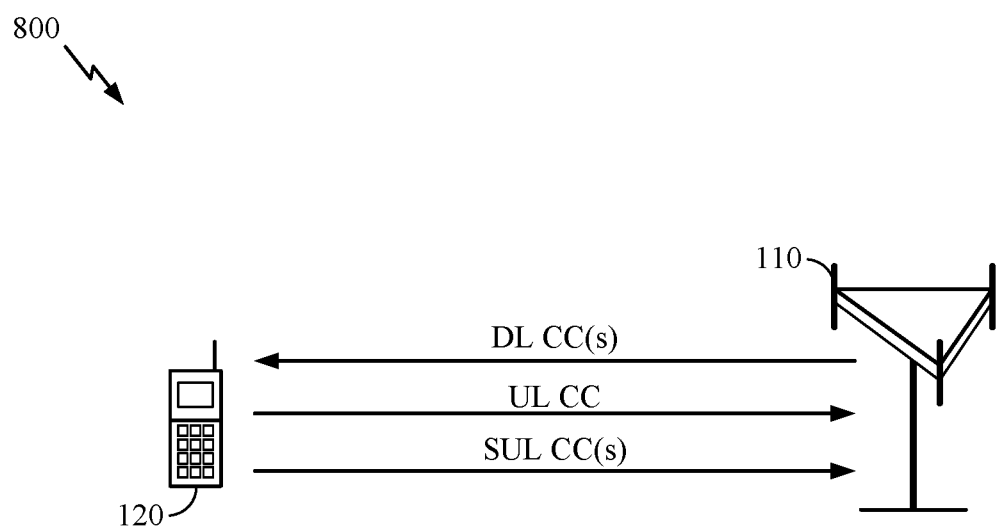
FIG. 8 illustrates an example scenario with supplemental uplink (SUL) component carriers, in which aspects of the present disclosure may be practiced.

As illustrated in FIG. 8, for NR, Supplemental UL (SUL) may also be utilized. Supplemental UL may generally refer to an UL CC without a corresponding DL CC in the cell. In other words, SUL may generally refer to the case when there is only UL resource for a carrier from the perspective of an NR device.

Aspects of the present disclosure provide techniques that may help support and enable RACH procedures in systems that allow a RACH transmission on either a (primary) UL CC or an SUL CC.

SUL CCs may be used as a complimentary access link for NR TDD and NR frequency division duplex (FDD) scenarios. In other words, a UE may select PRACH resources either in the NR TDD/FDD uplink frequency or the SUL frequency. The SUL frequency can be a frequency shared with LTE UL (e.g., at least for the case when NR spectrum is below 6 Ghz).

It may be desirable to minimize the impact to NR physical layer design to enable such co-existence. For NR, UE initial access may be based on a RACH configuration for an SUL carrier. The RACH configuration for the SUL carrier may be broadcast, for example, in remaining minimum system information (RMSI).

The configuration information for the SUL carrier may be sufficient for UEs to complete RACH procedure via only that SUL carrier (e.g., the configuration information may include all necessary power control parameters).

In some cases, the configuration information for the SUL carrier may also include a threshold. For example, the UE may be configured to select that SUL carrier for initial access if (and maybe only if) the reference signal receive power (RSRP) measured by the UE on the DL carrier where the UE receives RMSI is lower than the threshold.

If the UE starts a RACH procedure on the SUL carrier, then the RACH procedure may be completed with all uplink transmissions (e.g., Msg1, Msg3) taking place on that carrier. The network may be able to request a connected-mode UE to initiate a RACH procedure towards any uplink carrier for path-loss and timing-advance acquisition.

Allowing the RACH procedure on SUL may present various challenges. For example, if the SUL is paired with a NR TDD/FDD carrier, and the PRACH resources are available on a SUL carrier and a TDD/FDD carrier, allowing the RACH procedure on SUL will increase the collision probability during RA procedure.

This may be illustrated by considering an example with two UEs: UE1 and UE2. If UE1 selects SUL and UE2 selects the NR TDD/FDD carrier for PRACH transmission. If the two UEs select frequency resources for PRACH with the same frequency resource index, even though no collision happened during the Msg1 transmission, the two UEs may detect the same PDCCH and associated Msg2, random access response (RAR) with the same random access radio network temporary identifier (RA-RNTI) if the LTE scheme of RA-RNTI determination is applied.

In a 4-step random access (RA) procedure in LTE, the UE will monitor for the PDCCH identified by the RA-RNTI in the RA Response window after the transmission of the PRACH preamble, so as to detect the Msg2 (RAR). Taking FDD LTE as an example, the RA-RNTI is computed as:

$$RA\text{-}RNTI = 1 + t\_id + 10 * f\_id,$$

where t_id and f_id are the time and frequency resource index of PRACH.

Aspects of the present disclosure may help accommodate the use of SUL for RACH procedures, by having the search space for the RACH response (RAR) be dependent, at least in part, on the UL CC used for the RACH transmission (e.g., based on the corresponding carrier index).

Figure 9:
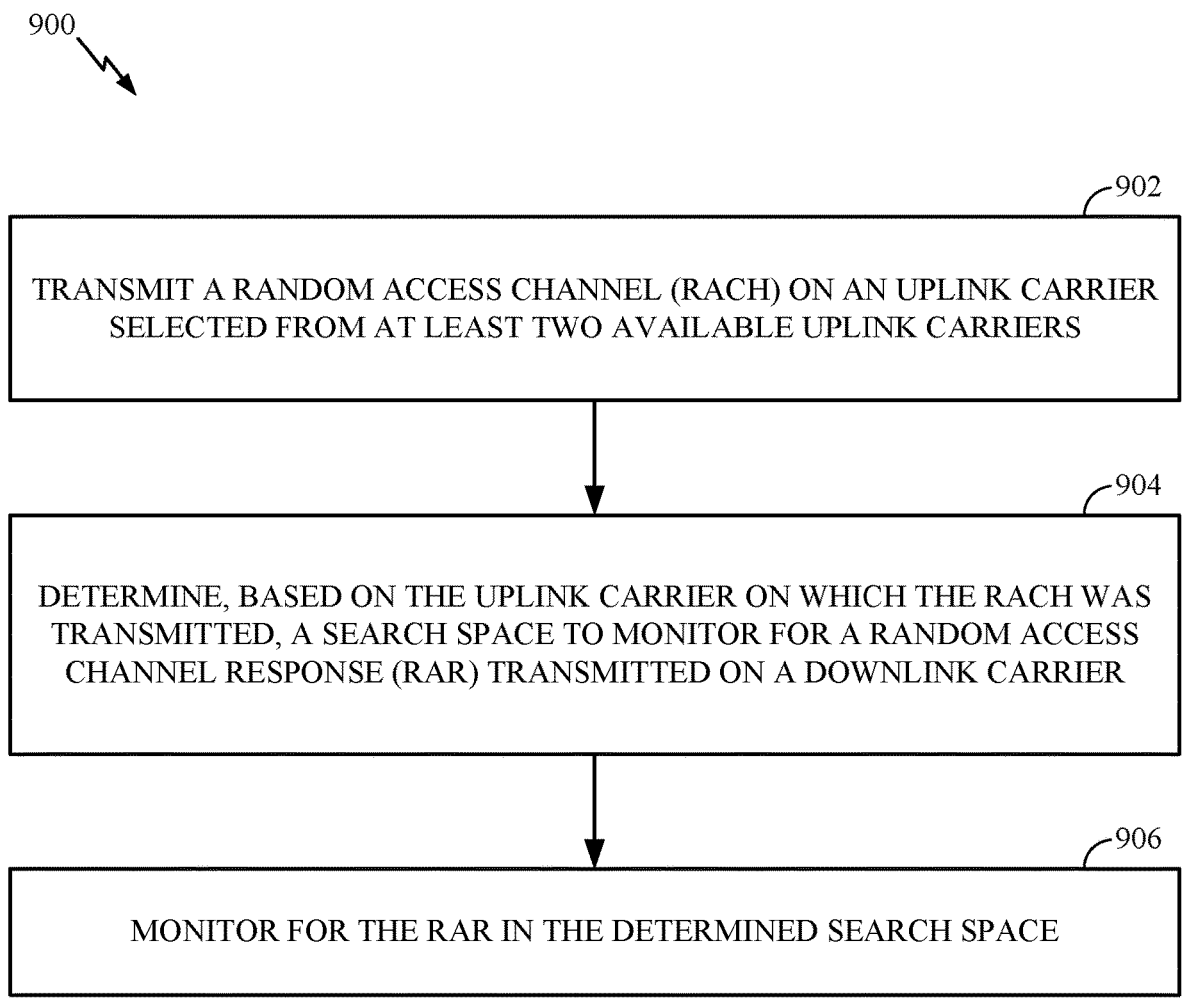
FIG. 9 illustrates example operations for wireless communications performed by a user equipment (UE), in accordance with certain aspects of the present disclosure.

FIG. 9 illustrates example operations 900 for wireless communications by a UE, in accordance with aspects of the present disclosure. Operations 900 may be performed, for example, by UE 120 shown in FIG. 1.

Operations 900 begin, at 902, by transmitting a random access channel (RACH) on an uplink carrier selected from at least two available uplink carriers. At 904, the UE determines, based on the uplink carrier on which the RACH was transmitted, a search space to monitor for a random access channel response (RAR) transmitted on a downlink carrier. At 906, the UE monitors for the RAR in the determined search space.

Figure 10:
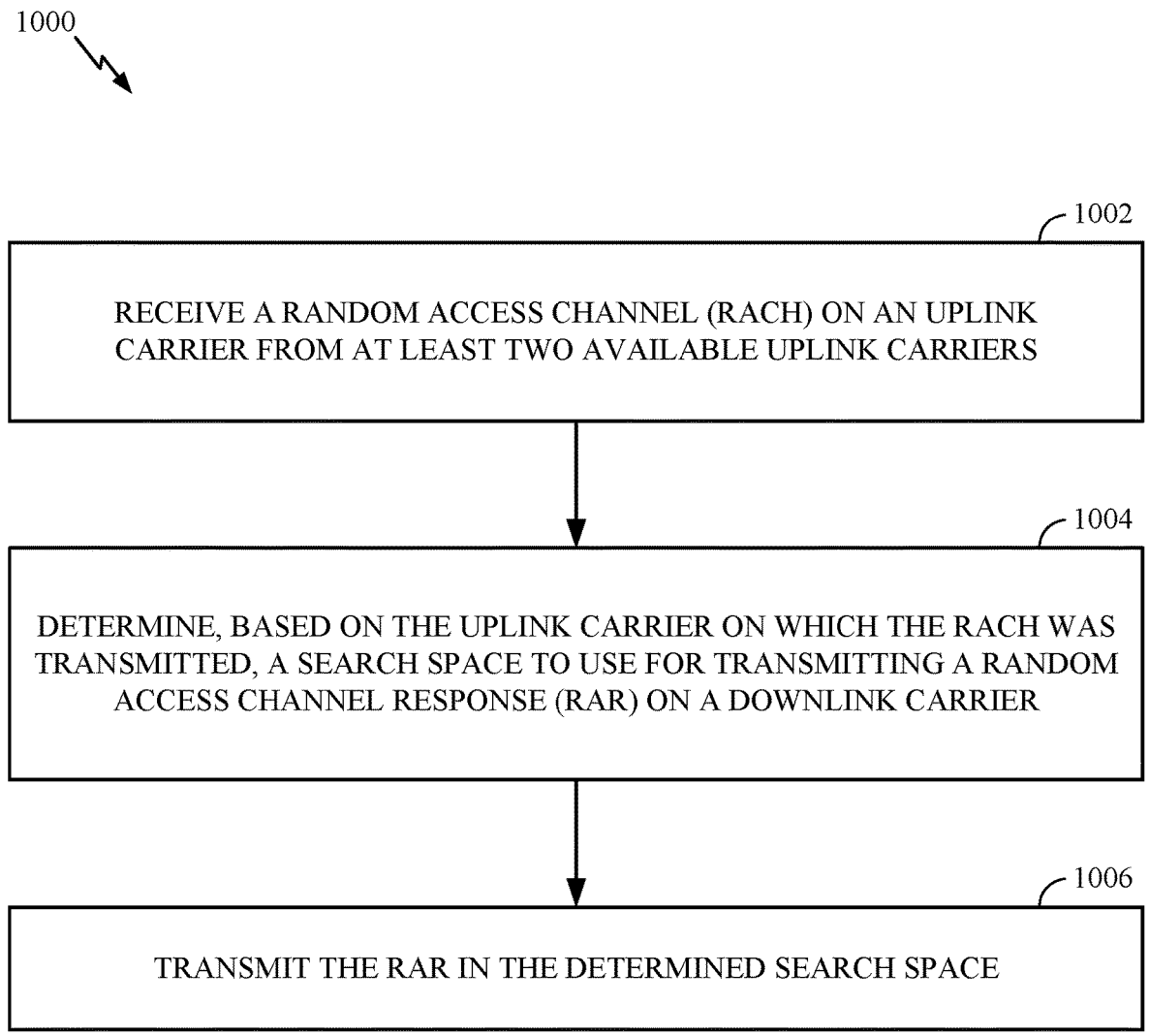
FIG. 10 illustrates example operations for wireless communications performed by a base station, in accordance with certain aspects of the present disclosure.

FIG. 10 illustrates example operations 1000 for wireless communications, in accordance with aspects of the present disclosure. Operations 1000 may be performed by a base station (e.g., a gNB), such as BS 110 shown in FIG. 1, performing initial access with a UE performing SUL based RACH operations 900 described above.

Operations 1000 begin, at 1002, by receiving a random access channel (RACH) on an uplink carrier from at least two available uplink carriers. At 1004, the gNB determines, based on the uplink carrier on which the RACH was transmitted, a search space to use for transmitting a random access channel response (RAR) on a downlink carrier. At 1006, the gNB transmits the RAR in the determined search space.

Figure 11:
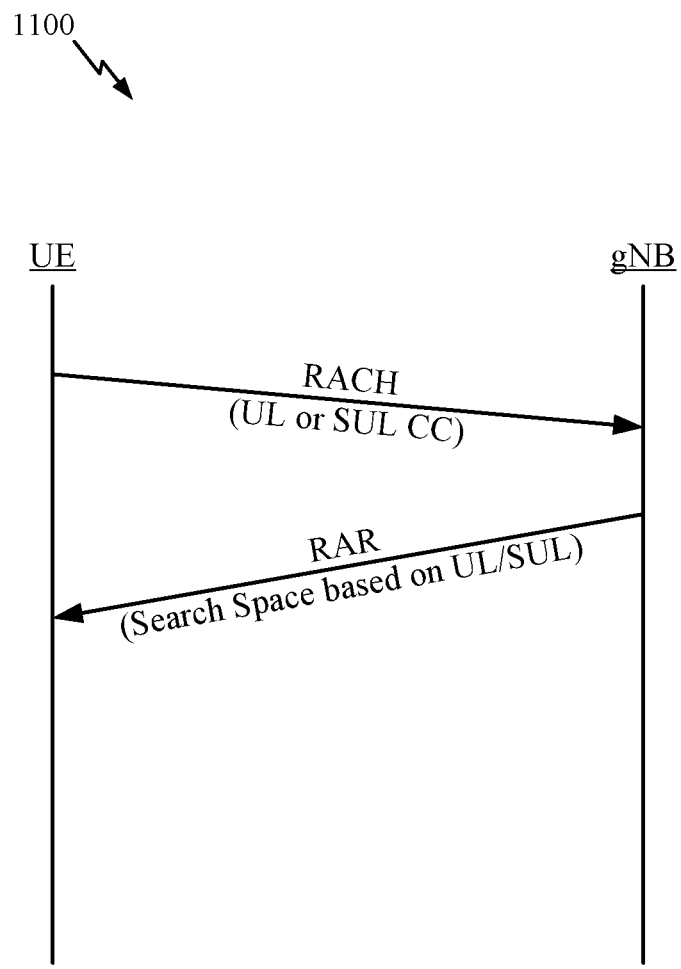
FIGS. 11 and 12 are example call flow diagrams with a UE and base station performing operations in accordance with FIGS. 9 and 10, respectively, in accordance with certain aspects of the present disclosure.

FIG. 11 illustrates how the search space for the RAR may depend on the UL CC selected for the RACH transmission. In other words, if the RACH is sent on a first UL (e.g., a NR TDD/FDD carrier), a first search space may be determined and (decoding candidates of that first search space) may be monitored for RAR.

On the other hand, if the RACH is sent on an SUL CC, a second search space may be determined and (decoding candidates of that second search space) may be monitored for RAR. Thus, being able to determine the search space for the RAR may reduce the number of decoding candidates a UE has to monitor (thereby reducing processing overhead).

As noted above, a control resource set (coreset) may include multiple search spaces. According to certain aspects, within a same coreset, one of the multiple search spaces for the RAR transmission may be assigned based on the carrier selected for the RACH transmission (e.g., based on the carrier index of the selected carrier).

In some cases, there may be separate coresets defined and one of the separate coresets used for the RAR transmission may be dependent on the carrier selected for the RACH transmission (e.g., based on the carrier index of the selected carrier). As a result, the search spaces corresponding to the different carriers will also be different.

Figure 12:
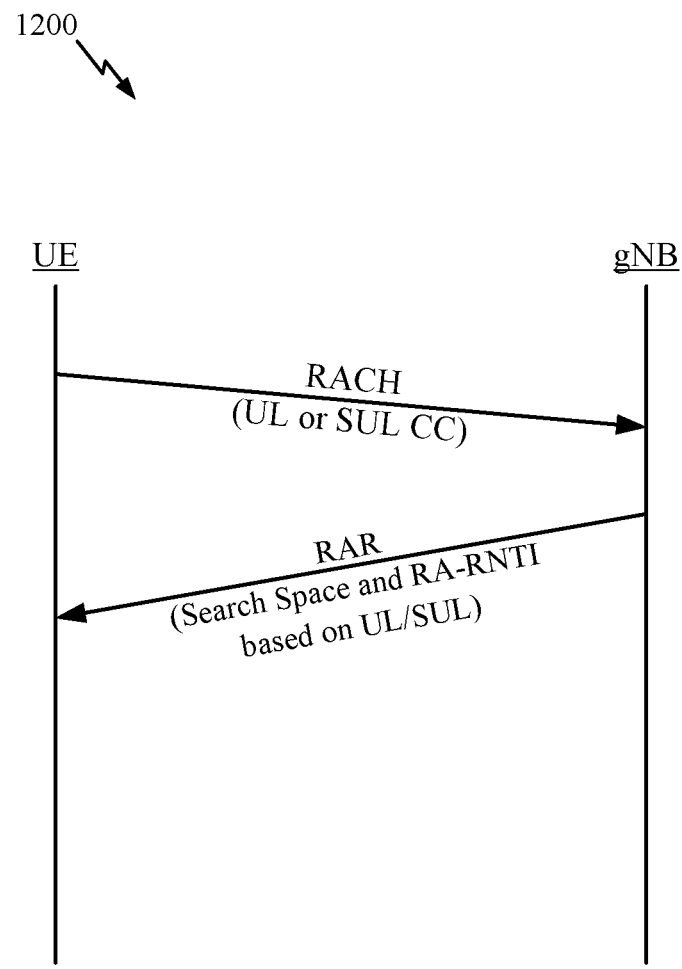

As illustrated in FIG. 12, in some cases, in addition to determining the RAR search space based on the carrier index of the UL carrier selected for RACH transmission, RA-RNTI may also be based on the selected UL carrier. In some cases, if the two carriers have different numerologies, RA-RNTI may also be based on the numerology, which may help further distinguish RAR transmissions.

As used herein, the term numerology generally refers to a set of parameters used for transmission in a carrier, such as tone spacing, and/or cyclic prefix lengths.

In addition, or as an alternative, a search space may also be determined based on the numerology. In such cases, based on a numerology for the uplink carrier on which the RACH was transmitted, a search space may be selected from at least two different search spaces within a same coreset.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   transmitting a random access channel (RACH) transmission on an uplink carrier selected from at least two available uplink carriers;
   determining, based on the uplink carrier on which the RACH transmission was transmitted, a search space to monitor for a random access channel response (RAR) transmitted on a downlink carrier, wherein determining the search space comprises:
      determining, based on the uplink carrier on which the RACH transmission was transmitted, a control resource set (CORESET) that includes time and frequency resources configured for conveying control information; and
      selecting, based on the uplink carrier on which the RACH transmission was transmitted, the search space from multiple search spaces within the determined CORESET;
   determining a random access radio network temporary identifier (RA-RNTI) based on an identifier of the selected uplink carrier; and
   monitoring for the RAR in the selected search space using the determined RA-RNTI.

2. The method of claim 1, wherein:
   the at least two available uplink carriers have different numerologies; and
   the RA-RNTI is determined also based on the numerology of the uplink carrier on which the RACH transmission was transmitted.

3. A method for wireless communications by a network entity, comprising:
   receiving a random access channel (RACH) transmission on an uplink carrier from at least two available uplink carriers;
   determining, based on the uplink carrier on which the RACH transmission was transmitted, a search space to use for transmitting a random access channel response (RAR) on a downlink carrier, wherein determining the search space comprises:
      determining, based on the uplink carrier on which the RACH transmission was transmitted, a control resource set (CORESET) that includes time and frequency resources configured for conveying control information; and
      selecting, based on the uplink carrier on which the RACH transmission was transmitted, the search space from multiple search spaces within the determined CORESET;
   determining a random access radio network temporary identifier (RA-RNTI) based on an identifier of the uplink carrier; and transmitting the RAR in the selected search space using the determined RA-RNTI.

4. The method of claim 3, wherein:
the at least two available uplink carriers have different numerologies; and
the RA-RNTI is determined also based on the numerology of the uplink carrier on which the RACH transmission was transmitted.

5. An apparatus for wireless communications by a user equipment (UE), comprising:
means for transmitting a random access channel (RACH) transmission on an uplink carrier selected from at least two available uplink carriers;
means for determining, based on the uplink carrier on which the RACH transmission was transmitted, a search space to monitor for a random access channel response (RAR) transmitted on a downlink carrier, wherein the means for determining the search space comprises:
means for determining, based on the uplink carrier on which the RACH transmission was transmitted, a control resource set (CORESET) that includes time and frequency resources configured for conveying control information; and
means for selecting, based on the uplink carrier on which the RACH transmission was transmitted, the search space from multiple search spaces within the determined CORESET;
means for determining a random access radio network temporary identifier (RA-RNTI) based on an identifier of the selected uplink carrier; and
means for monitoring for the RAR in the selected search space using the determined RA-RNTI.

6. The apparatus of claim 5, wherein:
the at least two available uplink carriers have different numerologies; and
the RA-RNTI is determined also based on the numerology of the uplink carrier on which the RACH transmission was transmitted.

7. An apparatus for wireless communications by a network entity, comprising:
means for receiving a random access channel (RACH) transmission on an uplink carrier from at least two available uplink carriers;
means for determining, based on the uplink carrier on which the RACH transmission was transmitted, a search space to use for transmitting a random access channel response (RAR) on a downlink carrier, wherein the means for determining the search space comprises:
means for determining, based on the uplink carrier on which the RACH transmission was transmitted, a control resource set (CORESET) that includes time and frequency resources configured for conveying control information; and
means for selecting, based on the uplink carrier on which the RACH transmission was transmitted, the search space from multiple search spaces within the determined CORESET;
means for determining a random access radio network temporary identifier (RA-RNTI) based on an identifier of the uplink carrier; and means for transmitting the RAR in the determined search space using the determined RA-RNTI.

8. The apparatus of claim 7, wherein:
the at least two available uplink carriers have different numerologies; and
the RA-RNTI is determined also based on the numerology of the uplink carrier on which the RACH transmission was transmitted.

9. An apparatus for wireless communications by a user equipment (UE), comprising:
a transmitter configured to transmit a random access channel (RACH) transmission on an uplink carrier selected from at least two available uplink carriers;
at least one processor configured to:
determine, based on the uplink carrier on which the RACH transmission was transmitted, a search space to monitor for a random access channel response (RAR) transmitted on a downlink carrier, wherein the at least one processor is configured to determine the search space comprises:
determining, based on the uplink carrier on which the RACH transmission was transmitted, a control resource set (CORESET) that includes time and frequency resources configured for conveying control information; and
selecting, based on the uplink carrier on which the RACH transmission was transmitted, the search space from multiple search spaces within the determined CORESET; and
determine a random access radio network temporary identifier (RA-RNTI) based on an identifier of the selected uplink carrier; and
a receiver configured to monitor for the RAR in the selected search space using the determined RA-RNTI.

10. An apparatus for wireless communications by a network entity, comprising:
a receiver configured to receive a random access channel (RACH) transmission on an uplink carrier from at least two available uplink carriers;
at least one processor configured to:
determine, based on the uplink carrier on which the RACH transmission was transmitted, a search space to use for transmitting a random access channel response (RAR) on a downlink carrier, wherein the at least one processor is configured to determine the search space by:
determining, based on the uplink carrier on which the RACH transmission was transmitted, a control resource set (CORESET) that includes time and frequency resources configured for conveying control information; and
selecting, based on the uplink carrier on which the RACH transmission was transmitted, the search space from multiple search spaces within the determined CORESET; and
determine a random access radio network temporary identifier (RA-RNTI) based on an identifier of the uplink carrier; and
a transmitter configured to transmit the RAR in the selected search space using the determined RA-RNTI.

* * * * *